US009654177B2

(12) United States Patent
Yamamoto (10) Patent No.: US 9,654,177 B2
(45) Date of Patent: May 16, 2017

(54) POWER LINE DATA TRANSMITTER (71) Applicant: DENSO CORPORATION, Kariya, Aichi-pref. (JP)

(72) Inventor: Kenji Yamamoto, Chita-gun (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 381 days.

(21) Appl. No.: 14/242,079

(22) Filed: Apr. 1, 2014

(65) Prior Publication Data

US 2014/0301491 A1 Oct. 9, 2014

(30) Foreign Application Priority Data

Apr. 5, 2013 (JP) ................. 2013-079493

(51) Int. Cl.
H04B 3/54 (2006.01)
(52) U.S. Cl.
CPC .................... *H04B 3/548* (2013.01)
(58) Field of Classification Search
CPC ...... H04B 2203/5412; H04B 2203/547; H04B 2203/5491; H04B 3/54; H04B 3/548
See application file for complete search history.

(56) References Cited

FOREIGN PATENT DOCUMENTS

JP 2007-189549 7/2007

OTHER PUBLICATIONS

Huang, Xiaoguang, "Power Line Communication for Automotive Applications" (2012). Theses and Dissertations. Paper 1707. Ryerson University.*

\* cited by examiner

*Primary Examiner* — Brian Zimmerman
*Assistant Examiner* — Sara Samson
(74) *Attorney, Agent, or Firm* — Harness, Dickey & Pierce, P.L.C.

(57) ABSTRACT

A power line data transmitter includes a power circuit including a transistor and a modulation circuit. The transistor has an input terminal to which a voltage of a DC power source is inputted from a DC power line, a control terminal applied with a constant voltage bias, and an output terminal supplied with an electric power. The modulation circuit includes a power supply node, operates when the electric power is inputted, and outputs a data modulation signal. The power circuit functions as a data transmitter to perform a power line transmission. When the data modulation signal is outputted, (i) a potential of the output terminal changes, (ii) the power circuit changes a voltage between the control terminal and the output terminal, (iii) the power circuit changes another potential of the input terminal, and (iv) the power circuit superimposes the data modulation signal on the DC power line.

6 Claims, 5 Drawing Sheets

POWER LINE DATA TRANSMITTER

CROSS REFERENCE TO RELATED APPLICATION

This application is based on Japanese Patent Application No. 2013-79493 filed on Apr. 5, 2013, the disclosure of which is incorporated herein by reference.

TECHNICAL FIELD

The present disclosure relates to a power line data transmitter to transmit a data through a power line.

BACKGROUND

Patent Document 1: JP-A-2007-189549

A power line communicator as described in Patent Document 1 is denoted as a PLC, and in recently, the power line communicator is used domestically. The power line communicator outputs a data modulation signal into a power line (for example, referring to Patent Document 1).

According to Patent Document 1, the power line communicator includes a wide band filter passing through a PLC signal of an entire communication frequency band, a narrow band filter passing through the PLC signal corresponding to each frequency band, a receiver for processing the PLC signal passing through the wide band filter and the narrow band filter, a modem inputting a received data from the receiver and transmitting date to the power line through a transmitter. The each of the frequency band is obtained by separating the entire communication frequency band into multiple frequency bands, and an influence, which disturbs a power line carrier communication, of noise, a disturbing signal or the like on the power line may be reduced, so that the communication may be performed properly.

The inventor of the present application has found the following.

The power line communicator in Patent Document 1 transmits a data on the power line of a business alternating current (AC) power source. The inventor has focused on a power line data transmitter that superimposes a data modulation signal on a direct current (DC) power line of a battery power line or the like, and transmits a DC power and the data through the DC power line.

A vehicle user in recent years requests to confirm a battery voltage reduction, a going off of a stop lamp, a residual quantity lowering of washer liquid, or the like in a check at a starting time. The above information has a relatively small amount of information. Thus, a communication speed may be slow, and a communication frequency may be low. It is not necessary to perform a communication process at a high speed or frequently with using a controller area network (CAN), a local interconnect network (LIN), or the like. It is preferable that a communication process suitable for this application may be realized by a circuit as simple as possible.

SUMMARY

It is an object of the present disclosure to provide a power line data transmitter that transmits a data modulation signal on a DC power line and performs a power line communication with using a simple circuit.

According to an aspect of the present disclosure, a power line data transmitter includes a power circuit including a transistor and a modulation circuit. The transistor has an input terminal to which a voltage of a direct current power source is inputted from a direct current power line, a control terminal applied with a constant voltage bias from the direct current power line, and an output terminal supplied with a electric power from the direct current power line through the input terminal with being applied by the constant voltage bias to the control terminal. The modulation circuit includes a power supply node, operates when the electric power through the power circuit is inputted from the power supply node, modulates a data, and outputs a data modulation signal from the power supply node. The power circuit functions as a data transmitter to perform a power line transmission. When the data modulation signal is outputted from the modulation circuit, (i) a potential of the output terminal of the transistor changes, (ii) the power circuit changes a voltage between the control terminal and the output terminal of the transistor, (iii) the power circuit changes another potential of the input terminal of the transistor, and (iv) the power circuit superimposes the data modulation signal on the direct current power line to perform the power line transmission.

According to the above power line data transmitter, it is possible that a data modulation signal on a DC power line is transmitted and a power line communication is performed with using a simple circuit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
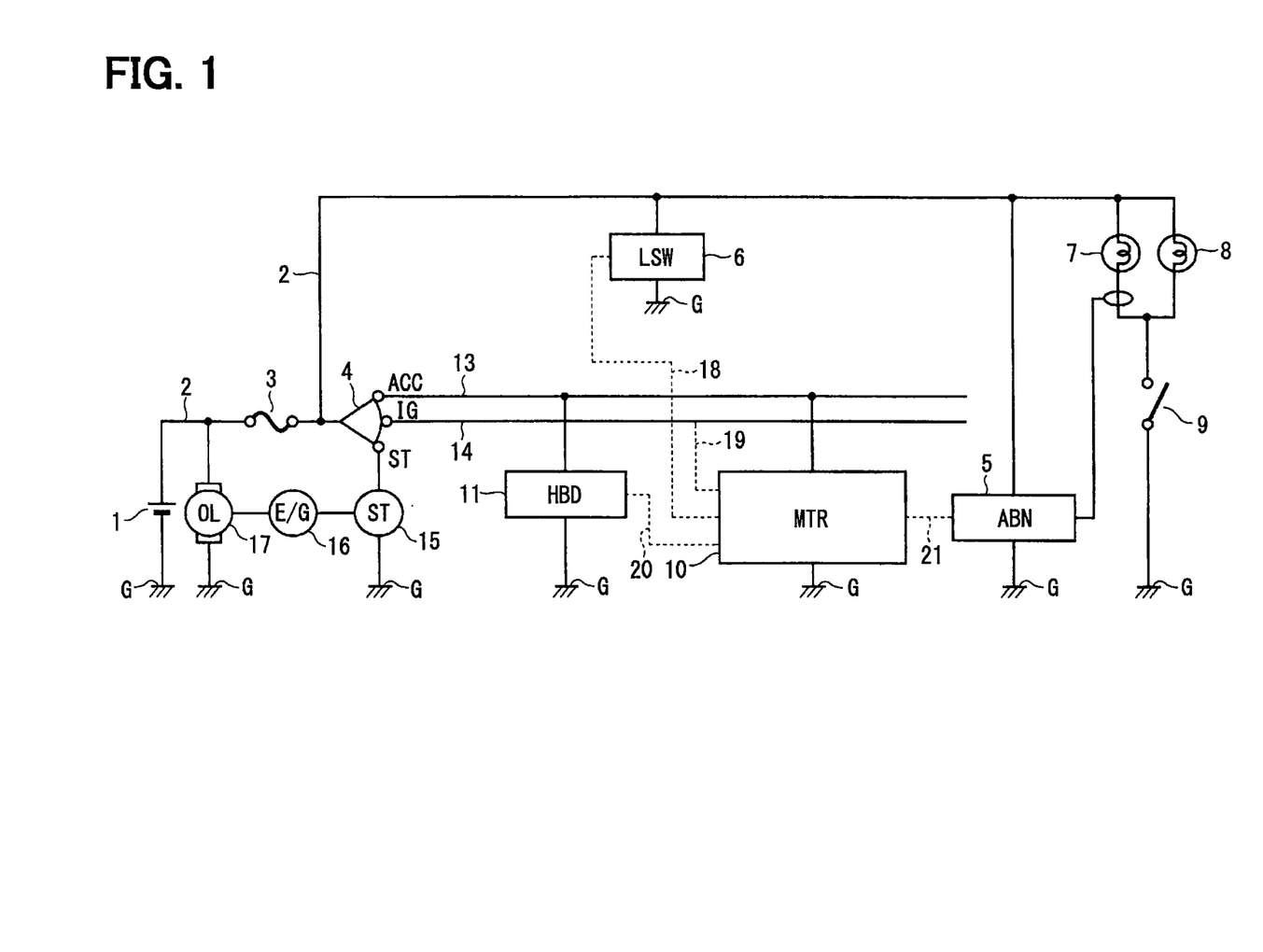
FIG. 1 is a block diagram schematically illustrating a power line communication between electric units in a vehicle with respect to an embodiment of the present disclosure.

As follows, an embodiment of the present disclosure will be described with reference to the drawings. FIG. 1 illustrates a wiring connection relation of a power line between each block in the vehicle and illustrates a connection example of an electric unit that is supplied with a direct current (DC) power. In the vehicle, a battery voltage is supplied from a battery 1 through a battery power line 2 (hereinafter, referred to as a power line 2). The power line 2 corresponds to a DC power line.

The power line 2 connects with an ignition switch 4 through a fuse 3. The ignition switch 4 switches a power supply of the battery 1 to each of the electric units 5 to 11 in the vehicle according to a user's switching operation.

For example, when the ignition switch 4 is in an off position, the battery 1 connects with an abnormal notification portion 5 and various lamp devices such as various lamp switches 6, a room lamp, and brake lamps 7, 8, and the power of the battery 1 is supplied to the abnormal notification portion 5 and the above lamp devices. The brake lamps 7, 8 normally have an impedance of about 10 to 100 Ω.

The brake lamp switch 9 connects with the brake lamps 7, 8 in series. When the brake lamp switch 9 turns on due to a user operation or the like of a brake pedal (not shown), the object lamps 7, 8 are energized to turn on the brake lamps 7, 8. The abnormal notification portion 5 detects whether the brake lamp 7 or the like is normally energized, and when the brake lamp 7 or the like is not energized normally, the abnormal notification portion 5 causes a meter 10 described below to notify an abnormality.

When the ignition switch 4 is in an ACC position (corresponding to an accessory position), a power supply voltage of the battery 1 is energized to another power line 13 in addition to the power line 2. The power supply voltage of the battery 1 supplies electricity to each of the electric units 10, 11. The electric units 10, 11 correspond to the meter 10, a human body detector 11 or the like. For example, the human body detector 11 corresponds to a clearance sonar, an occupant detection device, or the like.

For example, the meter 10 inputs a human body detection signal from the human body detector 11. The meter 10 detects a voltage of an IG power line 14 as a battery checker, notifies a status of the lamp switch 6, receives and notifies an abnormal notification signal (a diagnosis) from the abnormal notification portion 5, and notifies various statuses.

When the ignition switch 4 is switched to an IG position, the power supply voltage of the battery 1 is also supplied to the IG power line 14. When the ignition switch 4 is switched to a ST position (corresponding to a starter position), an engine starter 15 starts up an engine 16. When the engine 16 starts up, an alternator 17 starts to generate electricity, and the battery 1 is charged through the power line 2.

In a comparative configuration, as described by a broken line in FIG. 1, dedicated lines 18 to 21 between the lamp switch 6 and the meter 10, between the IG power line 14 and the meter 10, between the human body detector 11 and the meter 10, and between the abnormal notification portion 5 and the meter 10 are provided and connected. On the contrary, in the present embodiment, an embodiment that a power line communication is performed through the power line 2 at a side of the battery 1, the power line 13, and the IG power line 14 will be explained. The power line 2, the power line 13, and the IG power line 14 correspond to a DC power line.

Figure 2:
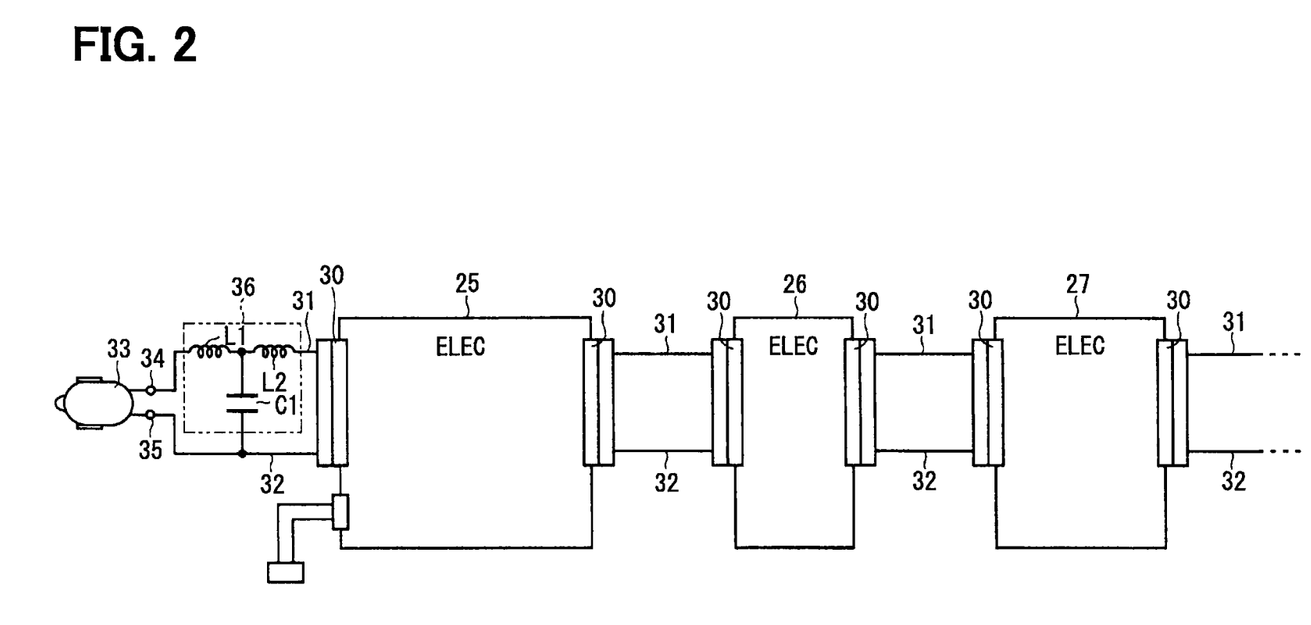
FIG. 2 is a drawing illustrating a configuration of a wire connection between each of the electric units.

FIG. 2 illustrates an implementation example of a vehicle device configuring the power line communication system. The electric units 25, 26, 27 may correspond to the meter 10, the human body detector 11, other types of sensors, various lamp switches 6, a room lamp unit, or the like. Each of the electric units 25, 26, 27 may be assembled above a single substrate with electronic parts into a unit.

Incidentally, FIG. 2 illustrates the electric units 25, 26, 27 as an example. The number of the electric units is not limited to three.

In FIG. 2, two wires 31, 32 between two adjacent electric units of the electric units 25, 26, 27 are adjusted to a length of some meters (e.g., about 1.5 m, 2 m, 2.5 m), for example. The two wires 31, 32 connect between connectors 30, which are provided at each of the electric units 25, 26, 27. Each of the electric units 25, 26, 27 is successively connected in cascade.

Incidentally, a user may provide an electric unit to the connector 30 additionally. The additional electric unit may be an illumination lamp unit (additional parts), an electric fan unit (additional parts), or the like. Some (e.g., seven) of the additional electric units may be connected in cascade. A connection wiring manner may be a parallel two wire feeder or may be a twisted pair wire. Electrically, the wire 31 corresponds to the power lines 2, 13, 14 in FIG. 1, and the wire 32 corresponds to a ground G in FIG. 1.

The electric unit 25 operates as a master in a master-slave system including all of the electric units 25, 26, 27. For example, the electric unit 25 superimposes a data modulation signal of a predetermined carrier wave frequency on the wires 31, 32. The other electric unit (e.g., the electric unit 26 or the electric unit 27) demodulates the data modulation signal and receives the data. Furthermore, the other electric units 26, 27 output a response data to the wires 31, 32 as the data modulation signal having a predetermined carrier wave frequency, and the electric unit 25 demodulates the data modulation signal.

Figure 3:
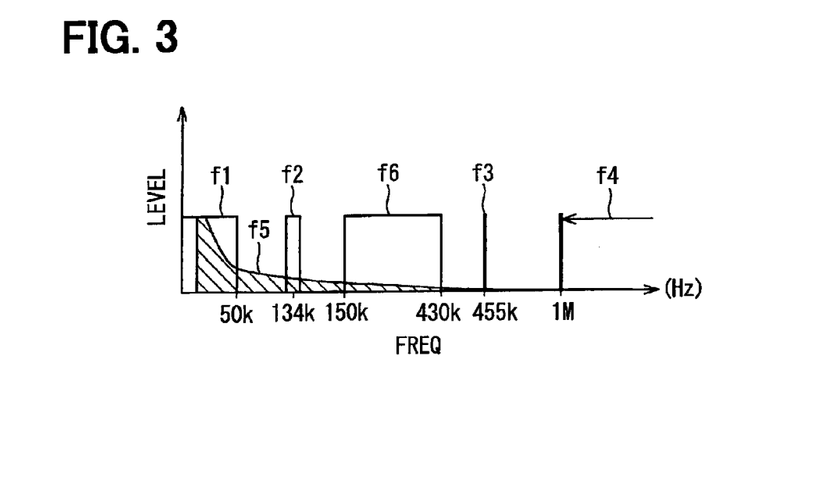
FIG. 3 is a drawing illustrating an example of a frequency band used by an apparatus for a vehicle.

FIG. 3 illustrates a frequency allocation of signals that the vehicle apparatus mounted to the vehicle uses. For example, an audio frequency band f1 corresponds to from 20 to 20000 kHz, a smart entry band f2 corresponds to 134 kHz, an intermediate frequency band f3 of an amplitude modulation (AM) radio corresponds to 455 kHz, a frequency f4 of 1 or more (MHz) corresponds to a clock frequency of a microcomputer mounted to an electronic control unit (ECU), an intermediate frequency band of an frequency modulation (FM) radio, an AM wave, an FM wave, and a digital terrestrial television broadcasting. In a vehicle, a racing noise is generated when an engine is in a high rotation. The generation frequency band of the racing noise is illustrated by f5. Incidentally, the smart entry band f2 may be used in a smart entry system, for example.

As described in FIG. 3, there is a free frequency band f6 (e.g., 150 to 430 kHz) between the smart entry band f2 and the intermediated frequency band f3 of the AM radio. The racing noise is little in the frequency band f6. Therefore, a predetermined frequency in the frequency band f6 is set to the carrier wave frequency for the power line communication. Noise may be superimposed on the power lines 2, 13, 14 in FIG. 1 through the alternator 17. The carrier wave frequency of the power line communication may be allocated to a frequency region that is different from a noise frequency of the alternator 17. An influence of a noise generated by the alternator 17 may be reduced as less as possible to perform the power line communication.

As described in FIG. 2, the electric unit 25 corresponds to the master, and an end portion of the electric unit 25 electrically connects with a cigar lighter socket 33 through the connector 30. The cigar lighter socket 33 connects with connection terminals 34, 35 in terms of DC, and the user may connect the cigar lighter socket 33 with an external apparatus (not shown). The connection terminals 34, 35 correspond to a power supply line of the power line 13 of the battery 1.

A low pass filter 36 is provided between the cigar lighter socket 33 (corresponding to an ACC power supply) and the connector 30 of the electric unit 25. The low pass filter 36 is an LC filter, in which coils L1, L2 and a capacitor C1 is provided in a T shape. When a power line communication is performed without the low pass filter 36, an impedance at a side of the battery (corresponding to the ACC power supply) may be about 1 to 2 Ω, and therefore, a communication signal between each of the electric units 25, 26, 27 during the power line communication may be negated.

Thus, by providing the low pass filter 36, the impedance at the side of the power source in a power line communication frequency band (150 to 430 kHz) is set to a high impedance and larger than tens of ohms (e.g., 50 Ω).

When the impedance is set to the high impedance, an electric configuration at sides of the cigar lighter socket 33 and the battery 1 and each of the electric units 25, 26, 27 are electrically separately considered, for example. In addition, even when an input impedance at a side of the low pass filter 36 has tens of ohms (e.g., 50 Ω), a reduction of the data modulation signal superimposed on the power lines 2, 13, 14 may be prevented to the utmost, and a matching of input/output impedance between each of the electric units 25, 26, 27 may be performed easily.

According to this configuration, it is possible to communicate data between each of the electric units 25, 26, 27 without receiving an influence of an impedance change in sides of the battery 1 and the cigar lighter socket 33 to the utmost.

Figure 4:
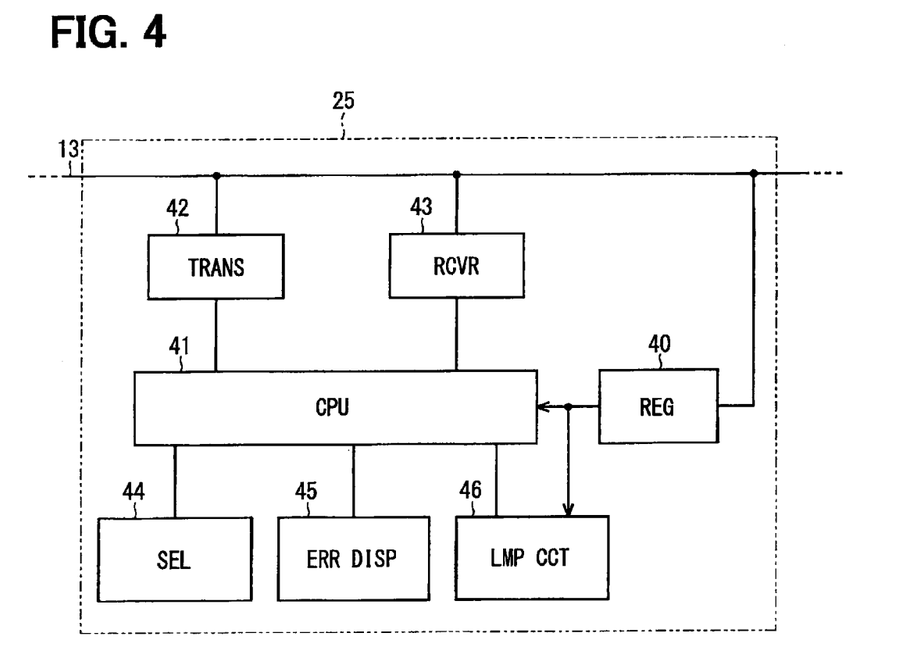
FIG. 4 is a block diagram schematically illustrating an electric configuration in an electric unit.

As follows, an example of an electrical configuration of the electric unit 25 connected with the ACC power line 13 will be explained with referring to FIG. 4 to FIG. 6. As described in FIG. 4, the electric unit 25, which is the master, includes a regulator 40, a CPU 41, a transmitter 42, a receiver 43, a selection switch 44, an error display portion 45 and an operation lamp lighting circuit 46. The electric unit 25 further includes a speaker driving driver (not shown), a speaker (not shown), and an external serial input/output interface circuit (not shown).

The regulator 40 has, for example, a three terminal regulator. When the battery 1 supplies the regulator 40 through the power line 13 with the power supply voltage, the regulator 40 performs a DC-DC conversion, and supplies the CPU 41 and the operation lamp lighting circuit 46 with the power supply voltage. The CPU 41 outputs a data (corresponding to digital signals of an H or an L) for an ASK conversion to the transmitter 42. The CPU 41 inputs an ASK demodulated data (corresponding to digital signals of the H or the L) from the receiver 43.

The selection switch 44 selects the other electric units 26, 27, which is the slave, to be a transmission destination. The CPU 41 switches the selection switch 44 so that the electric unit of the communication destination is switched. The error display portion 45 displays various errors of the electric units 26, 27 to be the slave, and displays a message indicating the error when an error is transmitted from the electric units 26, 27. The operation lamp lighting circuit 46 turns on an operation lamp according to an instruction from the CPU 41.

Figure 5:
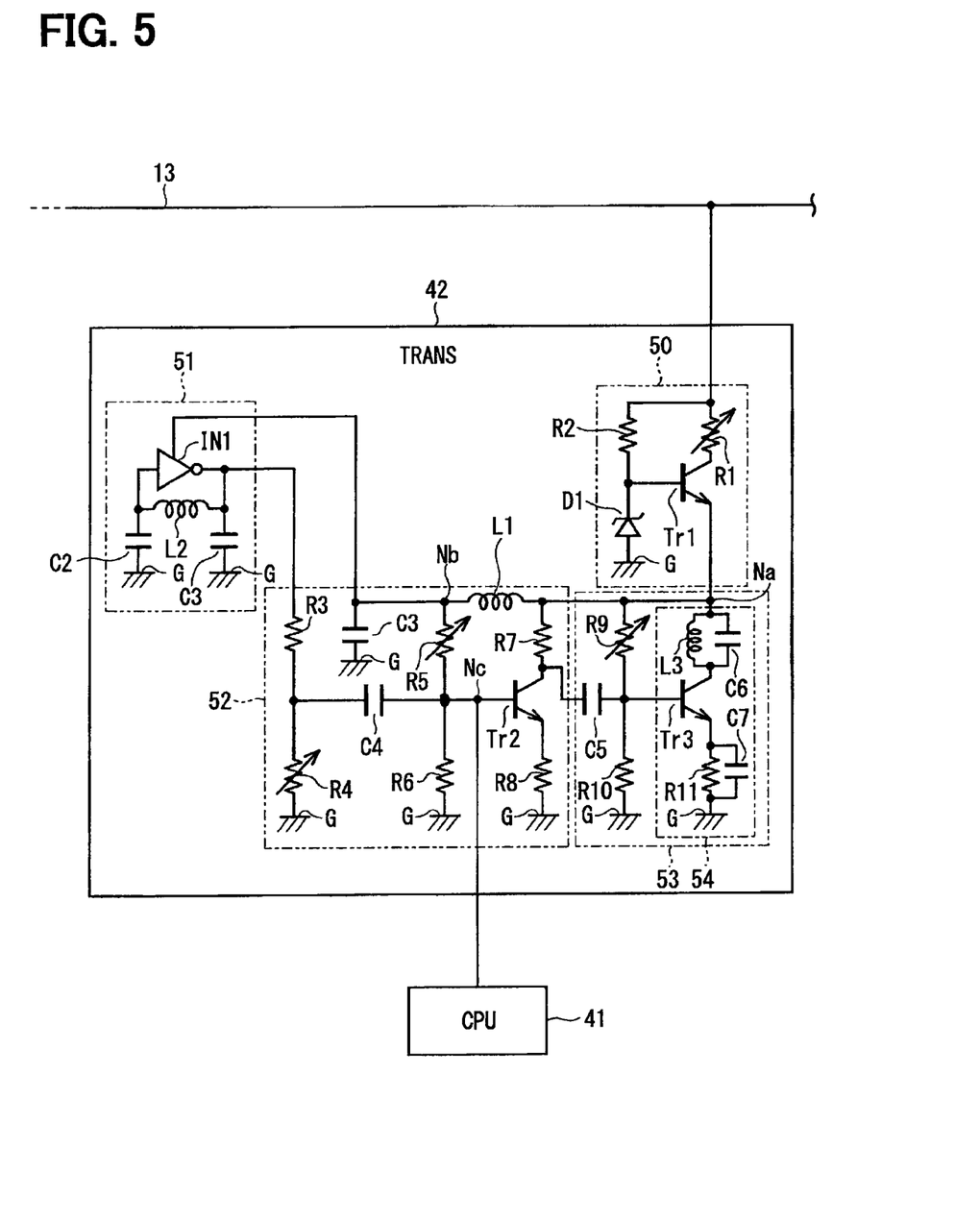
FIG. 5 is a circuit diagram illustrating an electric configuration of a transmitter.

FIG. 5 illustrates an example of a configuration of the transmitter 42. The transmitter 42 includes a power circuit 50, a carrier wave generation circuit 51, a modulation circuit 52, and an amplification circuit 53. The power circuit 50 is provided between the power line 13 and the modulation circuit 52 (or the amplification circuit 53).

The power circuit 50 includes an NPN transistor Tr1, resistors R1, R2, and a zener diode D1. The power circuit 50 functions as a data transmitter, which transmits the data modulation signal to the power line 13.

A collector (corresponding to an input terminal) of the NPN transistor Tr1 connects with the power line 13 through the resistor R1. Conventionally, a power circuit in a series regulator does not include the resistor R1 that is described in FIG. 5. A collector of the transistor Tr1 connects with the power line 13 directly. On the contrary, in the present embodiment, the collector of the transistor Tr1 connects with the power line 13 through the resistor R1.

The resistor R2 and the inverted zener diode D1 are connected between the power line 13 and the ground G in series. The inverted zener diode D1 corresponds to a constant voltage circuit. A common connection node of the resistor R2 and the zener diode D1 connects with a base of the NPN transistor Tr1. The power line 13 applies a constant voltage bias to the base of the NPN transistor Tr1. The base of the NPN transistor Tr1 corresponds to a control terminal.

When the power line 13 applies the constant voltage bias to the base of the transistor Tr1, the power circuit 50 supplies a power supply node Na through an emitter of the transistor Tr1 with the power supply voltage. The emitter of the transistor Tr1 corresponds to an output terminal. Since the power supply node Na connects with the modulation circuit 52 and the amplification circuit 53, the power supply voltage is supplied from the power circuit 50 to the modulation circuit 52 and the amplification circuit 53.

A coil L1 connects the power supply node Na of the amplification circuit 53 with the power supply node Nb at a side of a bias supply of the modulation circuit 52. A bypass capacitor C3 connects the power supply node Nb with the ground G. The coil L1 and the bypass capacitor C3 configure a cutoff filter of the data modulation signal. According to this configuration, it is possible that the power circuit 50 supplies the modulation circuit 52 through the power supply nodes Na, Nb with the power supply voltage, and in addition, supplies the carrier wave generation circuit 51 with the power supply voltage.

The carrier wave generation circuit 51 is provided by a combination of an inverter IN1, a coil L2, capacitors C2, C3. The carrier wave generation circuit 51 generates a carrier wave of a predetermined frequency (e.g., 200 kHz in a frequency band from 150 to 430 kHz). The carrier wave frequency is set to a frequency (e.g., 200 kHz) selected so as to avoid a frequency used by other vehicle apparatuses.

The modulation circuit 52 includes a voltage dividing circuit of the carrier wave, a bias circuit, and a preamplification circuit. The voltage dividing circuit includes resisters R3, R4. The bias circuit includes a capacitor C4 and resisters R5, R6. The preamplification circuit includes a transistor Tr2 and resistors R7, R8.

The voltage dividing circuit of the resisters R3, R4 divides an output carrier wave of the carrier wave generation circuit 51. The divided carrier wave is applied between the base and the emitter of the transistor Tr2 through the bias circuit, which includes the capacitor C4 and resistors R5, R6. The preamplification circuit with the transistor Tr2 amplifies the carrier wave.

The data output terminal of the CPU 41 connects with the base node Nc of the transistor Tr2. When the CPU 41 outputs a digital data having "H" or "L" to the base node Nc, the digital data is performed by an ASK modulation and the data modulation signal is outputted to the amplification circuit 53.

The amplification circuit 53 includes a bias circuit and a main amplification circuit 54. The bias circuit has the bypass capacitor C5, and resisters R9, R10. In the main amplification circuit 54, an LC parallel resonance circuit and a parallel circuit are connected and placed between a power supply node Na and the ground G. The LC parallel resonance circuit includes a capacitor C6 and a coil L3. The parallel circuit includes a transistor Tr3, a resistor R11, and a capacitor C7. The data modulation signal outputted by the modulation circuit 52 is applied to between the base and the emitter of the transistor Tr3 through the capacitor C5.

The LC parallel resonance circuit having the capacitor C6 and the coil L3 connects the power supply node Na with the collector of the transistor Tr3. The resonance frequency is roughly set according to the carrier wave frequency of the carrier wave generation circuit 51. The main amplification circuit 54 outputs the data modulation signal from the power supply node Na to the power line 13 through the power circuit 50.

Generally, the power supply node Na of a power circuit connects with a bypass capacitor, and a circuit is not usually configured that an electrical potential of the power supply node Na is changed. On the contrary, in the circuit configuration according to the present embodiment described in FIG. 5, the power supply node Na does not have a bypass capacitor, so that a current change may occur in the power supply node Na. The bypass capacitor does not connect with a position, where transmitter 42 is close to, of the power line 13.

Since the current change in the power supply node Na causes a change of an emitter potential of the transistor Tr1, when the potential between the base and the emitter of the transistor Tr1 is increased or decreased, a collector current in the NPN transistor Tr1 is increased or decreased, and the potential of the power line 13 may be changed and outputted through the resistor R1.

Figure 6:
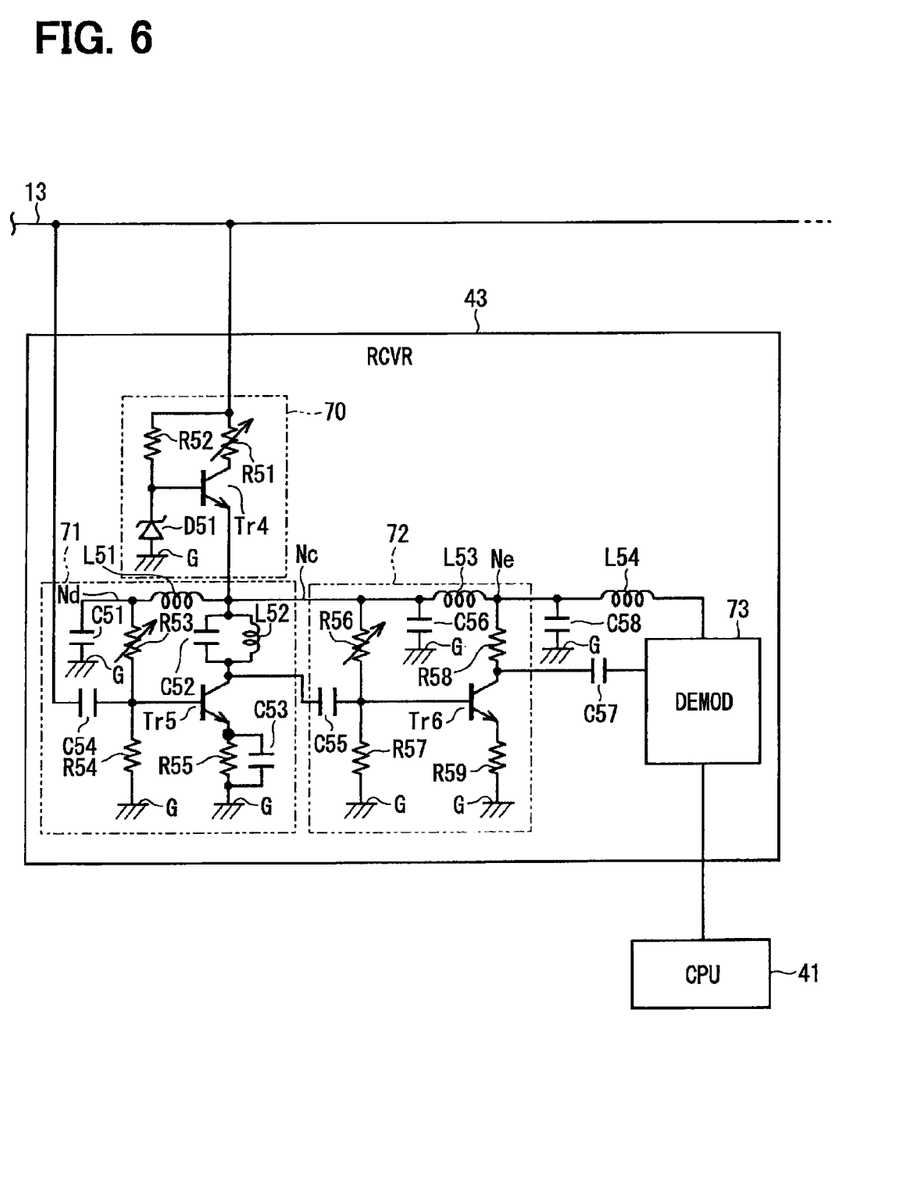
FIG. 6 is a circuit diagram illustrating an electric configuration of a receiver.

FIG. 6 schematically illustrates an example of a circuit configuration of the receiver 43. The receiver 43 includes a power circuit 70, a resonance amplification circuit 71, an amplification circuit 72, and a demodulator 73. The power circuit 70 connects with the power line 13, and is supplied with the power supply voltage from the power line 13. The power circuit 70 is provided between the power line 13 and the power supply node Nc of each of the circuits 71 to 73. The power circuit 70 includes the NPN transistor Tr4, resistors R51, R52, and the zener diode D51, and is supplied with a direct current power supply voltage from the power line 13.

The collector of the NPN transistor Tr4 connects with the power line 13 through the resistor R51. The resistor R52 and the inverted zener diode D51 are connected between the power line 13 and the ground G in series.

A common connection node of the resistor R52 and the zener diode D51 connects with the base of the NPN transistor Tr51. The power line 13 applies the constant voltage bias to the base of the transistor Tr1. When the power line 13 applies the constant voltage bias to the base of the transistor Tr1, the power circuit 70 supplies the power supply node Nc with the power supply voltage.

Incidentally, in the power circuit 70 of the receiver 43, an input impedance from the power line 13 may be better as high as possible, different from a case in the power circuit 50 of the transmitter 42 described above. In the circuit configuration in FIG. 6, the resistor R51 is provided between the power line 13 and the collector of the transistor Tr4. However, it may be possible that the collector of the transistor Tr4 directly connects with the power line 13 to provide a series regulator without providing the resistor R51.

In the resonance amplification circuit 71, a coil L51 connects the power supply node Nc with the power supply node Nd at a bias supply side. The capacitance C51 connects the node Nd with the ground G, so that the power supply voltage is supplied.

The resonance amplification circuit 71 includes resistors R53, R54 for defining a bias, a transistor Tr5, a resistor R55, capacitors C52, C53, and a coil L52. The resistors R53, R54 are connected between the node Nd and the ground G in series. The base of the transistor Tr5 connects with a common connection node of the resistors R53, R54.

A parallel resonance circuit having the capacitor C52 and the coil L52 connects the node Nc with the collector of the transistor Tr5. The resistor R55 and the capacitor C53 connect between the emitter of the transistor Tr5 and the ground G in parallel. The base of the transistor Tr5 connects with the power line 13 through a coupling capacitor C54. The data modulation signal is inputted through the capacitor C54.

The resonance frequency of the parallel resonance circuit having the capacitor C52 and the coil L52 is set according to the carrier wave frequency of the data modulation signal. The resonance amplification circuit 71 mainly amplifies the data modulation signal transmitted from the other electric unit.

The amplification circuit 72 connects with a subsequent stage of the resonance amplification circuit 71 through the coupling capacitor C55. The amplification circuit 72 is configured by a combination of the resistors R56 to R59, and the NPN transistor Tr6. The capacitor C56 for removing noise connects between the node Nc and the ground G. The coil L53 for removing noise connects between the node Nc and the power supply node Ne in series.

The resistors R56, R57 for providing the bias connect between the node Nc and the ground G in series. The base of the transistor Tr6 connects with a common connection node of the resistors R56, R57. The resistor R59 connects between the emitter of the transistor Tr6 and the ground G.

The resistor R58 connects between the node Ne and the collector of the transistor Tr6. As described above, the amplification circuit 72 includes an emitter feedback amplification circuit, amplifies the data modulation signal, and outputs the data modulation signal to the demodulator 73 through the coupling capacitor C57. The demodulator 73 demodulates the data modulation signal transmitted from the transmitter 42 of the other electric unit. The receiver 43 is configured as described above.

The other electric units 26, 27 corresponding to the slave include an electric configuration similar to the electric unit 25 corresponding to the master. Individual addresses are allocated to the electric units 25, 26, 27. Each of the electric units 25, 26, 27 may be changed to the master or the slave, and each of the electric units 25, 26, 27 may transmit and receive the data.

For example, in a configuration described in FIG. 1, when the abnormal notification portion 5 transmits the diagnosis as the data modulation signal to the meter 10 through the power lines 2, 13, the meter 10 may notify alarming information by turning on or blinking a warning lamp of an instrumental panel.

(Main Features of Present Embodiment)

Technical advantages according to the present embodiment will be described below.

The power circuit 50 has the transistor Tr1. A direct current is inputted to the collector of the transistor Tr1. The constant voltage bias is given to the base of the transistor Tr1. In such case, the power circuit 50 may provide the power supply node Na with the direct current through the transistor Tr1.

The modulation circuit 52 inputs the power of the power circuit 50 from the power supply node Na to operate, and generates the data modulation signal according to the output data of the CPU 41. The power supply node Na does not connect with the capacitor. According to this configuration, a large amount of the data modulation signal is leaked to the node Na. The emitter current of the transistor Tr1 changes according to a current change of the node Na, and the collector current and the collector voltage of the transistor Tr1 change according to the change of the emitter current. Accordingly, the transmitter 42 may output the data modulation signal to the power line 13 through the power circuit 50, and the transmitter 42 may transmit the data modulation signal to the other electric unit or the like.

Since the power circuit 50 functions as the data transmitter for transmitting the data modulation signal, the power circuit 50 may superimpose and transmit the data modulation signal to the power line 13 without separately providing a data transmission circuit at a subsequent stage of the amplification circuit 53 or without separately providing dedicated lines 18 to 21 or the like. According to this configuration, with using a more simple circuit, the data modulation signal may be superimposed on the power lines 2, 13, 14 to perform the power line communication.

The low pass filter 36 cuts a passing of the data modulation signal. When the low pass filter 36 as a cutoff circuit is provided to the power lines 2, 13, 14, 31 of the vehicle battery 1 between the battery 1 and the power circuit 50, or between the cigar lighter socket and the power circuit 50, it may be possible that an electrical configuration at a side of a battery 1 and an electrical configuration at a side of the cigar lighter socket 33 are considered to be separated from the electric units 25, 26, 27 to the utmost. Thus, a relation of the input/output impedance between each of the electric units 25, 26, 27 may be understandable easily. According to this configuration, an influence of the signal at the side of the battery 1, the signal at the side of the cigar lighter socket 33, a noise, a change of the impedance may be removed as far as possible, and a circuit designing of the transmitter 42, the receiver 43, or the like may be performed easily. Since a communication function may be realized by using a frequency band of 150 to 430 kHz, the transmitter 42 and the receiver 43 may be configured by a lumped constant circuit.

(Another Embodiment)

The present disclosure is not limited to the above embodiment. For example, a modification and an expansion may be possible as described below. In the above embodiment, the power lines 2, 13, 14 of the vehicle battery 1 are used as an example of DC power line. The data modulation signal will be superimposed on any form of a DC power line as long as a direct current power line is applied.

In the power circuit 50, an electrolytic capacitor may connect with the zener diode D1 in parallel. In the above embodiment, the transistors Tr1 to Tr6 are illustrated as a bipolar junction transistor (BJT), for example. Other types of a transistor such as a MOSFET or the like may be used.

According to the present disclosure, a transistor includes an input terminal to which a voltage of a direct current power source is inputted through a direct current power line, a control terminal applied with a constant voltage bias through the direct current power line, and an output terminal supplied with a power source from the direct current power line through the input terminal with being applied by the constant voltage bias to the control terminal. The power circuit includes the transistor. According to this configuration, it is possible that the power circuit supplies a power supply node with the direct current power source.

According to the present disclosure, a modulation circuit includes a power supply node, inputs the power source of the power circuit from a power supply node, operates, modulates a data, and outputs a data modulation signal from the power supply node. The power circuit functions as a data transmitter to output the data modulation signal. Thus, it is possible that the power circuit superimposes and transmits the data modulation signal on the direct current power line without separately providing a data transmission circuit. According to this configuration, it is possible that the data modulation signal is superimposed on the direct current line with using a simple circuit and that the power line communication is performed.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A power line data transmitter comprising:
   a power circuit including a transistor, the transistor having
      an input terminal to which a voltage of a direct current power source is inputted from a direct current power line, a total number of the input terminal of the transistor is equal to one,
      a control terminal applied with a constant voltage bias from the direct current power line, and
      an output terminal supplied with an electric power from the direct current power line through the input terminal with the constant voltage bias being applied to the control terminal; and
   a modulation circuit that operates when receiving electric power from the power circuit from a power supply node through the input terminal and modulates data to output a data modulation signal from the power supply node,
   wherein the power circuit functions as a data transmitter to perform a power line transmission,
   wherein, when the data modulation signal is outputted from the modulation circuit,
   (i) a potential of the output terminal of the transistor changes,
   (ii) the power circuit changes a voltage between the control terminal and the output terminal of the transistor,
   (iii) the power circuit changes the potential of the input terminal of the transistor, and
   (iv) the power circuit superimposes the data modulation signal on the direct current power line to perform the power line transmission, and
   wherein, when the modulation circuit changes the potential of the output terminal, the potential of the input terminal changes and the power circuit, which is also the data transmitter, outputs the modulation signal to the direct current power line through the input terminal.

2. The power line data transmitter according to claim 1, wherein
   the direct current power line uses a power line of a vehicle battery.

3. The power line data transmitter according to claim 1, further comprising
   a cutoff circuit being placed to a power line between a vehicle battery and the power circuit, or between a cigar lighter socket and the power circuit, wherein
   the cutoff circuit cuts off a passing of the data modulation signal.

4. The power line data transmitter according to claim 3, further comprising
   a carrier wave generation circuit connected with the modulation circuit, and supplied with the electric power through the power supply node, wherein
   the carrier wave generation circuit generates a carrier wave having a predetermined frequency.

5. The power line data transmitter according to claim 1, wherein
the input terminal is electrically connected to the direct current power line at one point per power line data transmitter, and
a variable resistor is interposed between the input terminal and the direct current power line.

6. A power line data transmitter comprising:
a power circuit including a transistor, the transistor having
an input terminal to which a voltage of a direct current power source is inputted from a direct current power line,
a control terminal applied with a constant voltage bias from the direct current power line, and
an output terminal supplied with an electric power from the direct current power line through the input terminal with the constant voltage bias being applied to the control terminal; and
a modulation circuit that operates when receiving electric power from the power circuit from a power supply node through the input terminal and modulates data to output a data modulation signal from the power supply node,
wherein the power circuit functions as a data transmitter to perform a power line transmission, and
wherein, when the data modulation signal is outputted from the modulation circuit,
(i) a potential of the output terminal of the transistor changes,
(ii) the power circuit changes a voltage between the control terminal and the output terminal of the transistor,
(iii) the power circuit changes the potential of the input terminal of the transistor, and
(iv) the power circuit superimposes the data modulation signal on the direct current power line to perform the power line transmission, wherein:
a total number of the input terminal of the transistor is equal to one;
the power circuit, which is also the data transmitter, receives the electric power from the direct current power line through the input terminal;
the modulation circuit is supplied with the electric power from the power circuit and operates, the electric power being received through the input terminal; and
when the modulation circuit changes the potential of the output terminal, the potential of the input terminal changes and the power circuit, which is also the data transmitter, outputs the modulation signal to the direct current power line through the input terminal.

* * * * *